June 19, 1923. 1,459,408
A. M. LOCKETT
WATER HEATER WITH PERCOLATOR
Filed June 26, 1922  2 Sheets-Sheet 1

Inventor
Andrew M. Lockett,
by W. Schornborn,
Attorney

WITNESS:-
Chas. L. Griesbauer

June 19, 1923.

A. M. LOCKETT 1,459,408

WATER HEATER WITH PERCOLATOR

Filed June 26, 1922　　2 Sheets-Sheet 2

Patented June 19, 1923.

1,459,408

UNITED STATES PATENT OFFICE.

ANDREW M. LOCKETT, OF NEW ORLEANS, LOUISIANA.

WATER HEATER WITH PERCOLATOR.

Application filed June 26, 1922. Serial No. 570,994.

*To all whom it may concern:*

Be it known that I, ANDREW M. LOCKETT, a citizen of the United States, and a resident of New Orleans, in the parish of Orleans and State of Louisiana, have invented a new and useful Improvement in Water Heaters with Percolators, of which the following is a specification.

This invention relates to water heaters and is more especially designed and adapted to instantaneously heat small quantities of water for use in connection with a percolator in making coffee, or other purposes where small quantities of hot water are used, or desired in constant or intermittent flow.

To make coffee properly and as is practiced in New Orleans, it is required to pour over the coffee grounds a small quantity of cold water which serves the purpose of making the coffee grounds more compact thereby delaying the rate of travel through the coffee grounds of the boiling hot water which is subsequently added. The water with which the coffee is usually made is boiled in a separate vessel and the cook stands by with a spoon and ladles this boiling water into the upper section of the pot containing the coffee grounds, adding only about a tablespoonful of said boiling water at intervals of two or three minutes, so that the passing of the hot water through the grounds and finished coffee dripping from said grounds into the heated lower receiving section or vessel is not in any degree forced, thereby producing a black coffee which is in the nature of a concentrated extract and has all the qualities of the finished coffee known as New Orleans drip coffee.

The objects of the invention are:

First, to produce a water heater having the above general characteristics which has a minimum of weight and number of simple parts which can be cheaply manufactured and assembled or taken apart for inspection and after said parts are properly arranged and adjusted the action of the heater is automatic and constant in its action.

Second, to design a water heater which is capable and particularly adapted to properly and instantaneously heat water to a boiling point and so cooperate with a coffee pot or percolator as to introduce in regulable quantity and positively control said heated water into the coffee grounds, and at the same time automatically carry out all the steps of making concentrated extract or black coffee as heretofore explained and manually made.

Third, to provide a device of the above referred to nature which is adapted to efficiently and expeditiously carry out all the functions and operations heretofore described and capable of being used in conjunction with an electric heater or on a gas, oil or coal stove and hence have universal application no matter what source of heat is available.

Fourth, to construct, proportion and arrange the parts of the heater so that the same can be easily adapted and used in connection with the common and standard forms or types of coffee percolators and at the same time is ornamental and can be used on the dining room table and, while in use its center of gravity is at a low level thereby insuring its stability and against danger of upsetting.

Other objects and advantages of the construction and arrangement of the invention will appear from the detailed description of the manner of assembly and operating the same to be hereinafter given.

The invention consists of structural characteristics and relative arrangement of elements which will be hereinafter more fully described and particularly pointed out in the appended claims.

In the drawings in which similar reference characters indicate the same parts in the several figures of the drawings.

Figure 1:
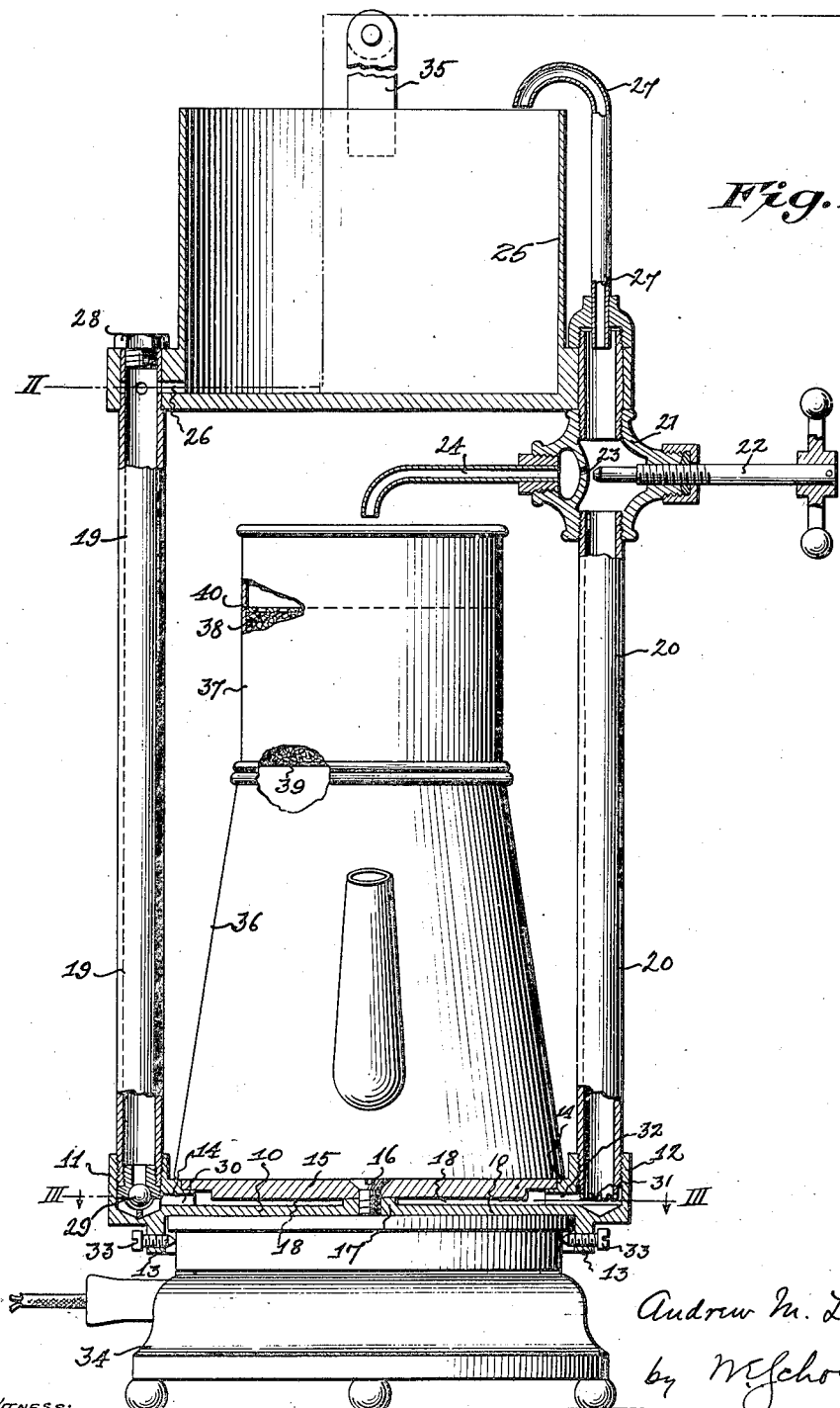
Figure 1 is a side elevation partly in section of the water heater and showing the same used in conjunction with an electric heater and coffee percolator.
Figure 2:
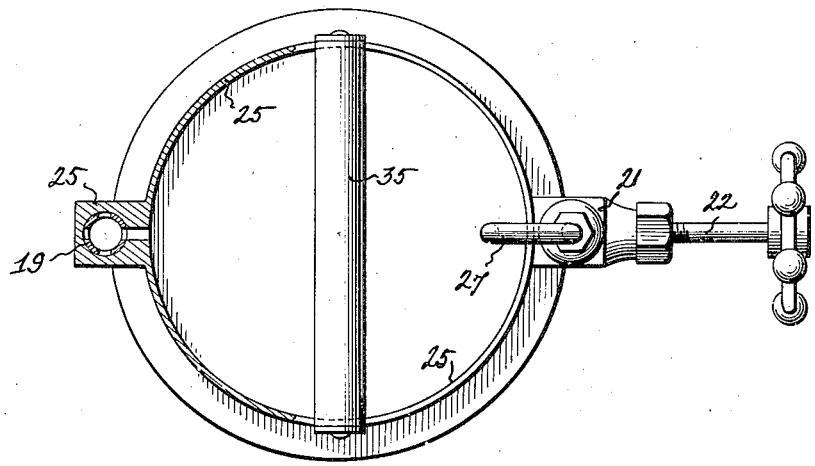
Figure 2 is a section on line II—II of Fig. 1.
Figure 3:
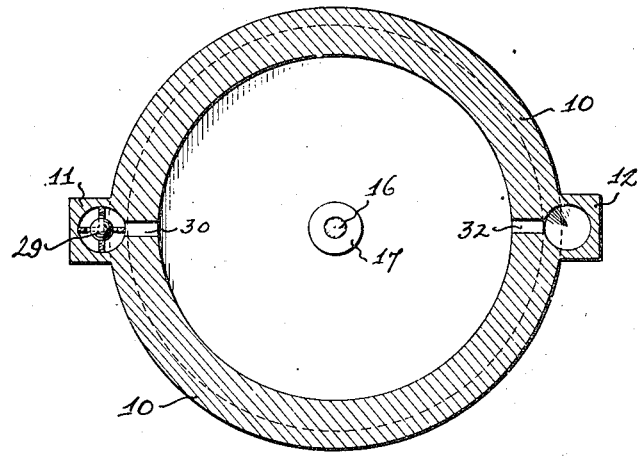
Figure 3 is a section on line III—III of Fig. 1.

Referring to the drawings 10 is a lower heating disk or plate preferably circular in shape provided with upper oppositely arranged tubular and internally threaded extensions 11 and 12, and an annular flange 13 on its underside as shown in Fig. 1.

Snugly fitted within and resting on an annular shoulder 14 in the upper side of the lower plate 10 is an upper plate 15 which is so constructed and proportioned that when said plate 15 is screwed down by a screw bolt 16 on a small central lug 17 on plate 10, there is formed a very thin or shallow water space 18 between said upper and lower plates 15 and 10 for purposes to be presently described.

Connected to the threaded extension 11 is an upright tube 19, while to the opposite threaded extension 12 is also provided a shorter tube 20, having connected at its upper end a controlling valve 21, said valve 21 being provided with a stem 22 the end of which stem engages valve seat 23 and controls communication between the feed pipe or outlet tube 24 with the interior of tube 20, as will be readily understood.

25 is an upper storage receptacle or reservoir supported by and secured to the upper end of the tube 19 and casing of the valve 21, and the lower section or bottom of the receptacle 25 is by means of passage-way 26 in communication with the upper end of the tube 19. A vent pipe 27 has its lower end or opening connected with the interior of the casing or valve 21, while its upper open end permanently overhangs the interior of the receptacle 25, so that any fluid rising beyond the end of said vent pipe 27 will be deposited in said reservoir or receptacle 25. The upper open end of the tube 19 is closed by a screw plug 28 which may be removed when desired to inspect and clean the interior of said tube 19, while within the tubular extension 11 and at the bottom open end of the tube 19 is provided a check valve 29 to prevent the return of the water into the tube 19 and back in the reservoir 25 on the first boiling of the water to be presently described, and the lower edge of the seat of the check valve 29 is brought slightly below the upper surface of the port 30, communicating between the shallow water space 18 and interior of tubular extension 11.

The lower end of the pipe 20 within the tubular extension 12 is provided with notches 31 whose upper edges are flush with the top of the port 32 communicating between the space 18 and tubular extension 12, which arrangement of notches insures the steam generated in said space 18 to ascend the pipe 20 rather than pipe 19.

33 are set screws passing through properly spaced and suitably threaded openings in the lower annular flange 13, and are adapted to firmly engage and hold a suitable electric heater 34 in contact with the underside of the lower heating plate 10 as will be readily understood and needs no further explanation.

35 is a handle attached to the upper reservoir 25 whereby the water heater, or combined water heater and percolator, may be lifted or moved from place to place.

36 is a percolator of the common and well known form and type which is adapted to rest on the upper or outer surface of the upper plate 15 provided with a removable upper section 37 adapted to receive coffee grounds 38 between its fixed perforated bottom 39 and perforated diffusing plate 40 of larger mesh as indicated in Fig. 1.

The parts of the water heater being constructed and arranged, and the coffee percolator 36 adjusted and supported as illustrated in Fig. 1, the manner of operating the invention is as follows:

The necessary quantity of coffee grounds 38 having been correctly placed between the fixed and removable perforated or strainer plates 39 and 40 in the upper section 37 of the percolator 36, and said percolator properly adjusted beneath the feed pipe or outlet tube 24, the valve stem 22 is screwed down against its seat 23, so that communication between the tube 20 and said feed pipe 24 is cut off. The amount of water which is desired to be converted into coffee is then poured into the receptacle or reservoir 25, after which the valve stem 22 is unseated from the seat 23 for a short period thereby allowing a small quantity of cold water to uniformly spread over and pass through the upper perforated or diffusing plate 40 and at the same time displace the air within the water space 18 and start circulation within the heater, said cold water also serving the purpose of making the coffee grounds 38 disposed between the perforated plates 39 and 40 more compact thereby delaying the percolation of the boiling water which is subsequently passed through said packed coffee grounds. Seeing that the valve 22 is firmly seated against its seat 23, the water heater with the adjusted percolator 36 is connected to an electric heater as shown in Fig. 1, or the lower heating plate 10 is placed over any other suitable source of heat as a gas or oil stove. It will be found after an elapse of a short time steam will sputter from the vent pipe 27 indicating that the water in the water space 18 is at a boiling temperature, when the valve stem 22 is again unseated from its seat 23 to such a degree as to permit the desired drops or flow of hot water through the feed pipe 24 onto the diffusing plate 40, thence through the coffee grounds 38 and perforated plate or strainer 39 into the lower section or pot of the percolator, 36, this operation being continuous, automatic and under perfect control by the adjustment of the valve stem 22 for the reason that the water in the reservoir 25 passes continually through passage-way 26 down tube 19, through check valve 29 and port 30 into and through the restricted or shallow water space 18, thence through port 32 up into tube 20 and out of feed pipe 24 and vent pipe 27, said latter pipe 27 taking care of the surplus hot water which is in excess of that capable of passing out of said pipe 24 and said surplus hot water being returned to the reservoir 25 and said operation is continued until the desired amount of coffee has been collected in the bottom section or pot of the percolator.

From the foregoing disclosure of the construction, operation, and mode of using the water heater, it will be seen that all the objects and advantages recited in the statement of invention have been fully and efficiently carried out, and while I have shown and described one and my preferred form of the water heater, it will be readily seen that many changes will readily suggest themselves without departing from the essential features, and although I show the use of a check valve 29, notches 31, and vent pipe 27, these may be omitted if so desired.

What I claim is:

1. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe having its opening situated between said reservoir and upper plate.

2. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe and a vent pipe.

3. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe having its opening situated between said reservoir and upper plate and a vent pipe, and a valve for regulating the communication between said feed pipe and second tube.

4. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe having its opening situated between said reservoir and upper plate and a vent pipe so constructed and arranged to deliver its overflow to said reservoir.

5. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe having its opening situated between said reservoir and upper plate and a vent pipe so constructed and arranged to deliver its overflow into said reservoir, and a valve for regulating the communication between said feed pipe and second tube.

6. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a check valve in said tube interposed between said reservoir and hollow water space between said plates, a second tube having one end communicating with the space between the lower and upper plates and its other end provided with a feed pipe and vent pipe, and a valve for controlling and regulating the communication between said feed pipe and second tube.

7. A water heater comprising a lower heating plate, an upper plate arranged in proximity to said lower plate and forming therewith a shallow water space between said lower and upper plates and so constructed and disposed to support a percolator, a percolator, a reservoir above said lower heating plate, a tube having one end communicating with said reservoir and its other end with the space between said lower and upper plates, a second tube having one end communicating with the space between the lower and upper plates and its other end provided with a feed pipe having an outlet so constructed, arranged and disposed to deposit in the upper section of said percolator supported on said upper plate any heated water flowing from said outlet.

8. A water heater comprising a lower heating plate, an upper plate arranged in proximity to said lower plate and forming therewith a shallow water space between said lower and upper plates, a reservoir above said lower heating plate, a tube having one end communicating with said reservoir and its other end with the space between said lower and upper plates, a second tube having one end communicating with the space between the lower and upper plates and its other end provided with a feed pipe and a vent pipe, a percolator said feed pipe having an outlet so constructed, arranged and disposed to deposit in the upper section of said percolator supported on said upper plate any heated water flowing from said outlet, and a valve for controlling and regulating the communication between said feed pipe and second tube.

In testimony whereof I affix my signature.

ANDREW M. LOCKETT.